United States Patent [19]

Pelster et al.

[11] Patent Number: 5,085,668
[45] Date of Patent: Feb. 4, 1992

[54] SINGLE-STEP PRINTING OF CELLULOSE FIBERS WITH TRIPHEN-DIOXAZINE REACTIVE DYES AND WITH SODIUM ACETATE OR SODIUM TRICHLORO-ACETATE AS ALKALI

[75] Inventors: Gerhard Pelster, Kelkheim; Wolfram Schidlo, Hofheim am Taunus, both of Fed. Rep. of Germany

[73] Assignee: Hoechst AG, Frankfurt am Main, Fed. Rep. of Germany

[21] Appl. No.: 602,754

[22] Filed: Oct. 24, 1990

Related U.S. Application Data

[63] Continuation of Ser. No. 418,527, Oct. 3, 1989, abandoned.

[30] Foreign Application Priority Data

Oct. 5, 1988 [DE] Fed. Rep. of Germany ....... 3833864

[51] Int. Cl.$^5$ .................... D06P 1/38; D06P 3/66; C09B 62/00
[52] U.S. Cl. .................................. 8/549; 8/532; 8/543; 8/594; 8/601; 8/918
[58] Field of Search .................. 8/549, 594, 601, 543

[56] References Cited

U.S. PATENT DOCUMENTS

| | | | |
|---|---|---|---|
| 4,588,411 | 5/1986 | Scheibli et al. | 8/528 |
| 4,622,396 | 11/1986 | Harms et al. | 544/76 |
| 4,786,721 | 11/1988 | Tzikas et al. | 534/617 |
| 4,841,048 | 6/1989 | Sawamoto et al. | 544/74 |
| 4,841,049 | 6/1989 | Seitz | 544/76 |
| 4,874,857 | 10/1989 | Harms | 544/75 |

*Primary Examiner*—A. Lionel Clingman

[57] ABSTRACT

On testing triphendioxazine reactive dyes it was found that they are unsuitable for almost all conventional single-step printing processes since they are not stable under these conditions.

In the course of the development of an uncomplicated single-step printing process for these dyes, it has been found according to the invention, then, that by replacing the customary fixing alkali (NaHCO$_3$) by stoichiometrically specific amounts of sodium acetate or sodium trichloroacetate or certain mixtures of sodium trichloroacetate and sodium acetate it is possible to fix triphendioxazine reactive dyes in full yields without change in hue. In addition, it is possible to print conventional print pastes.

3 Claims, No Drawings

SINGLE-STEP PRINTING OF CELLULOSE FIBERS WITH TRIPHEN-DIOXAZINE REACTIVE DYES AND WITH SODIUM ACETATE OR SODIUM TRICHLORO-ACETATE AS ALKALI

This application is a continuation of copending application Ser. No. 07/418,527, filed on Oct. 3, 1989 abandon.

The present invention relates to the preparation of strong and brilliant prints with fiber-reactive triphendioxazine dyes on textile material which consists of cellulose fibers or contains cellulose fibers blended with other fibers.

The single-step printing of cellulose textiles by direct printing with reactive dyes has been common knowledge for a considerable time. In contradistinction from two-step printing techniques, where the printing ink is made up without the alkaline fixing aid and the latter is applied only in a separate operation, i.e. in a second step, to the printed and dried material, the print pastes, if to be applied in a single step, already contain the alkali, conventionally sodium carbonate or bicarbonate, necessary to fix the reactive dyes to the printed cellulose fibers. After printing and drying, such single-step prints are fixed by treatment with saturated steam at 102°-106° C.

The triphendioxazine reactive dyes considered here for printing cellulose fibers are likewise a conventional class of coloring organic substances which are described for example in Published European Patent Applications EP-A-0,234,778, EP-A-0,260,227, EP-A-0,214,093, EP-A-0,158,110, EP-A-0,271,656, to mention but a few.

Such alkali-fixable blue dyes, which by their constitution belong to the category of polycyclic chemical products having heterocyclic structural elements, are commercially available, equipped with a wide variety of reactive systems, and are to replace over the long run in particular the costly anthraquinone-based dyes used today for this purpose.

Suitable fiber-reactive systems on the chromophores of these water-soluble dyes are not only those groupings which react with the OH-containing constituents of the cellulosic fiber molecule by an addition mechanism, for example the vinylsulfonyl radical itself or a precursor therefor (which forms during the dyeing in an alkaline medium such a characteristic group as an intermediate, in particular a sulfatoethylsulfonyl group and the like), but also those which react with the fiber substance by substitution reaction, for example reactive substituents on mono- or dihalogenated heterocycles such triazine, pyrimidine, quinoxaline and the like (which are easily detachable and leave behind an electrophilic radical), so that all of them are capable of entering a covalent bond in this manner. In this respect, interest must be given in particular to those derivatives of the triphendioxazine series which contain one or more different or identical fiber-reactive groupings of the abovementioned type on the same molecule of the dye bonded directly to an aromatic ring of the chromophore or via a short-chain, preferably aliphatic, bridge member, and in which, if different bisreactive radicals are present, for example a terminal vinylsulfonyl reactive group can be bonded to the chromophore of the triphendioxazine via a halogen-containing, heterocyclic configuration.

The colorants used for carrying out the prints are listed in the COLOUR INDEX, 3rd edition, 1971, and supplements 1975, 1982 and 1987, under the generic heading of C. I. Reactive Dyes.

A disadvantage of these coloristically valuable dyes of the triphendioxazine type (applicable to all two-step printing techniques), however, has been found to be that they are unsuitable for almost all conventional single-step printing techinques using sodium bicarbonate as fixing alkai since they are unstable under the fixing conditions customary therein. The otherwise bright blue colors of the dye patterns become distorted to unsightly, dull bluish to olive shades, due essentially to an alkali destruction of the chromophore (not only of the fixed but also of the unfixed dye portion) during the steaming operation.

Laid-Open European Patent Application EP-A-0,144,093, then, discloses a single-step printing process wherein the usual sodium bicarbonate is replaced by sodium acetate as fixing alkali for reactive dyes to improve the storage stability of the print pastes. The amounts used therein are supposed to be 2 times to at most 6 times the stoichiometric amount per fiber-reactive radical. The switch of fixing alkali is said to counteract premature deactivation of the reactive system in the water-containing pastes; technical teaching realating to the prevention of destruction of the chromophoric molecule cannot be derived from this publication. However, on following the directions given therein it has been found that this procedure does not give the same color yields as are obtained with sodium carbonate, in particular in the case of deep prints such as black, navy and the like.

As mentioned above, it must be considered a disadvantage of triphendioxazine reactive dyes that they cannot be used under the conditions of bicarbonate fixation since the dye molecule is not sufficiently stable.

It is an object of the present invention to develop an uncomplicated single-step printing process whereby these triphendioxazine reactive dyes can be fixed without impairing their chromophore in order that they may become available for single-step printing at all. This objective is then to make possible on the one hand the production of bright blue shades and on the other, in blends with dyes of different structures and different hues, the production of bright navys to attractive blacks.

It has now been found that this object is achieved according to the invention by a process for the single-step printing of textile material which consists of cellulose fibers or contains cellulose fibers blends with other fibers with fiber-reactive triphendioxazine, dyes, which comprises adding to the print pastes apart from at least one dye of the abovementioned type as the sole fixing alkali a) per reactive group of the dye used from 10 to 20 times the stoichiometric amount of sodium acetate (calculated on the anhydrous product) or b) 20–40 of sodium trichloroacetate per kg of print paste or c) a mixture of 20–40 g of sodium trichloroacetate per kg of print paste and 15–30 g of sodium acetate trihydrate per kg of print paste and fixing the prints produced therewith, after drying, by steaming with saturated steam at temperatures within the range of 102°-110° C.

In variant a) of the process, it is advantageous to dispense with the otherwise customary addition of urea.

Dye fixation by the claimed process generally requires steaming times of 8–15 minutes.

Usable fiber blends for treatment by the novel process are those of cellulose with synthetic fibers, primarily polyester fibers.

The above-defined single-step printing technique makes it possible, then, to use triphendioxazine reactive dyes without loss of depth and without change in hue as sole dyes for bright blue shades or, mixed with reactive dyes of different structures, as the basis for navy or black shades. In addition, reactive dyes can be printed by the conventional single-step technique using sodium bicarbonate as fixing alkali since, after all, the fixing conditions in the steam are in both cases the same.

The process according to the present invention differs from the conventional processes for preparing single-step prints only in that triphendioxazine reactive dye print pastes are made up not with sodium bicarbonate as fixing alkali but with the reagents and reagent quantities defined according to the invention.

The process according to the invention also ensures print stability during drying and any subsequent storage of the printed batches prior to fixation.

The Examples which follow will explain the invention in comparison with the prior art process.

In the Examples, the dyes are used in commercial form and concentration.

EXAMPLE 1

(A) Prior Art Process Using Sodium Bicarbonate

A mercerized cotton fabric is printed with a print paste prepared by intimately mixing the ingredients specified hereinafter at room temperature:

| | |
|---|---|
| 40 g | of the blue reactive dye of the formula |

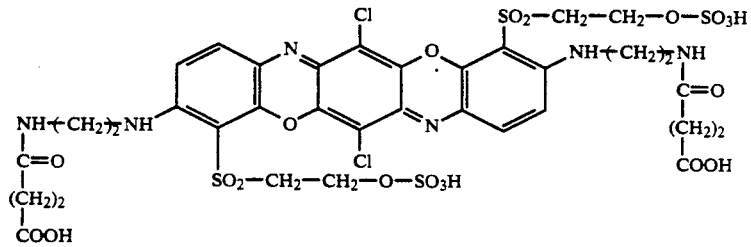

| | |
|---|---|
| 100 g | of urea |
| 250 g | of water |
| 450 g | of a medium-viscosity alginate thickening (7% strength) |
| 25 g | of sodium bicarbonate |
| 50 g | of the sodium salt of m-nitrobenzoic acid (as aqueous solution 1:4) |
| 85 g | of makeweight (water or thickening) |
| 1,000 g | | and it is dried at 100° C. for 5 minutes. To fix the printed dye, each a section of the treated fabric is steamed at 105° C. for 8, 12 or 24 minutes, then rinsed with water, soaped off until neutral and finally finished.

The results obtained are blue prints where the dye shows a certain degree of destruction with increasing steaming time. Even the print steamed for just 8 minutes no longer bears any relationship to the shade to be expected with other application techniques, and is completely unusable.

(B) Process According to the Invention

In place of the 25 g of sodium bicarbonate per kg mentioned under method A, the print paste specified there contains in this case 47 g of sodium acetate ×3 H$_2$O per kg and no urea but instead 163 g of makeweight per kg. Otherwise the prints are produced and fixed completely the same way.

The result is in all 3 cases a full, bright blue print without hue impairment.

EXAMPLE 2

A causticized viscose staple fabric is printed with a print paste containing:

| | |
|---|---|
| 20 g | of the blue reactive dye of the formula |

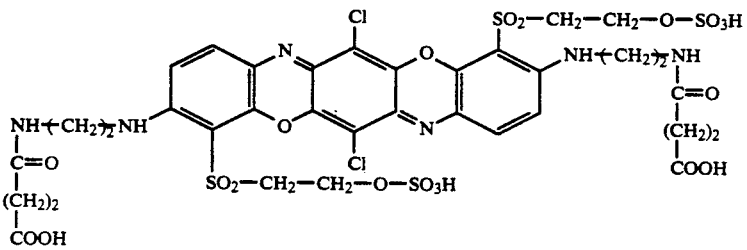

| | |
|---|---|
| 15 g | of the disazo dye Reactive Black 5 of C.I. No. 20505 |
| 5 g | of the red reactive dye of the formula |

—continued

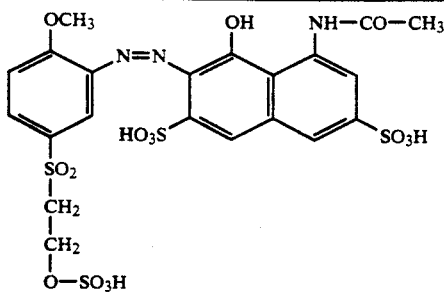

| 250 g | of water |
| --- | --- |
| 50 g | of the sodium salt of m-nitrobenzoic acid (as aqueous solution 1:4) |
| 50 g | of sodium acetate × 3 H₂O |
| 500 g | of a medium-viscosity alginate thickening (7% strength) |
| 110 g | of makeweight (water or thickening) |
| 1,000 g | | the printed fabric is dried at 100° C. and then steamed at 103° C. for 10 minutes to fix the dye. The fabric thus treated is then soaped off with water until neutral and finished. The result obtained is a deep navy print.

If 20 g of sodium bicarbonate per kg are experimentally added to the above print paste and otherwise the same procedure is adopted, the only print pattern obtained on the fabric is a reddish anthracite shade, since this fixing alkali has destroyed the triphendioxaxine blue component used.

EXAMPLE 3

To prepare the print pattern, the print paste of Example 2 has added to it in place of 50 g of sodium acetate × 3H₂O per kg
- 80 g of sodium trichloroacetate (as aqueous solution 1:1) per kg and
- 100 g of urea per kg (the total amount of water including the makeweight is then only 230 g/kg), and otherwise the same procedure as described above is adopted.

The result obtained is a navy print having the same color yield as in Example 2.

In this case too an addition of bicarbonate leads to the destruction of the blue portion of the printed color.

EXAMPLE 4

A mercerized cotton fabric is printed with a print paste containing the following constituents:

| 18 g | of the blue reactive dye of the formula |
| --- | --- |

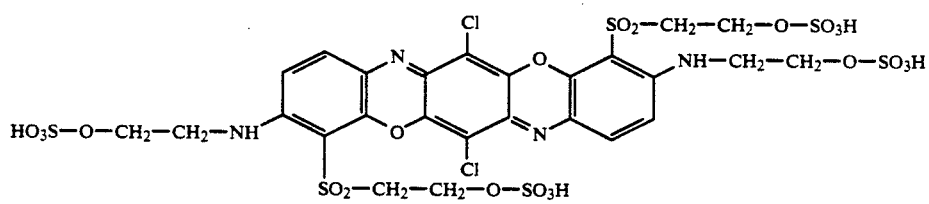

| 14 g | of the disazo dye Reactive Black 5 of C.I. No. 20505 |
| --- | --- |
| 6 g | of the yellow reactive dye of the formula |

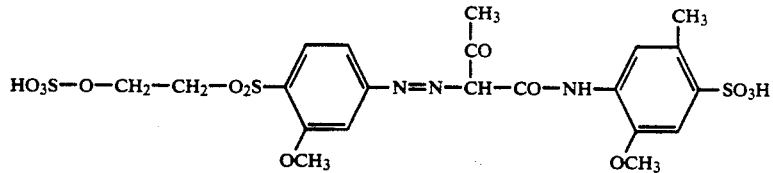

| 100 g | of urea |
| --- | --- |
| 250 g | of water |
| 50 g | of the sodium salt of m-nitrobenzoic acid (as aqueous solution 1:4) |
| 60 g | of sodium trichloroacetate (as aqueous solution 1:1) |
| 20 g | of sodium acetate × 3 H₂O |
| 450 g | of thickening (as in Example 1) |
| 32 g | of makeweight (water or thickening) |
| 1,000 g | | the fabric thus treated is dried, steamed at 105° C. for 8 minutes to fix the dye and then finished as in the preceding examples. The result obtained is a navy print.

It the print is repeated for the same print paste after a week and steamed, washed and soaped off, the same print result is obtained without loss of depth of shade or change in hue.

EXAMPLE 5

To carry out the printing operation, the print pastes of Examples 1A and 1B contain instead of the vinylsulfonyl reactive dye used therein the blue reactive dye of the following formula:

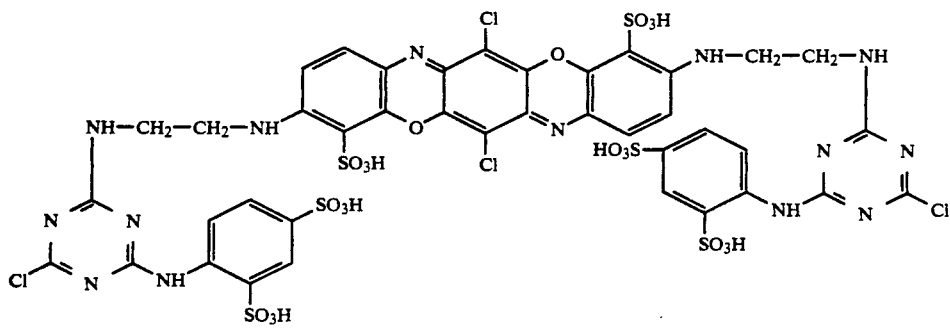

Each print pattern is produced, dried, steamed and aftertreated exactly as described in Example 1A or 1B.

The results obtained by variant A are unusable prints as a consequence of partial or complete destruction of the chromophore.

Variant B, however, produces a bright, deep blue print having good fastness properties.

We claim:

1. A process for the single-step printing of textile material which consists of cellulose fibers or contains cellulose fibers blends with other fibers with fiber-reactive triphendioxazine dyes, which comprises adding to the print pastes at least one triphendioxazine dye and as the sole fixing alkali
   a) per reactive group of the dye used from 10 to 20 times the stoichiometric amount of sodium acetate (calculated on the anhydrous product) or b) 20–40 g of sodium trichloroacetate per kg of print paste or c) a mixture of 20–40 g of sodium trichloroacetate per kg of print paste and 15–30 g of sodium acetate trihydrate per kg of print paste and fixing the prints produced therewith, after drying, by steaming with saturated steam at temperatures within the range of 102°–110° C.

2. The process as claimed in claim 1, wherein in the variant a) the otherwise customary addition of urea is dispensed with.

3. The process as claimed in claim 1, wherein the dried prints are steamed for 8–15 minutes to fix the dye.

* * * * *